United States Patent [19]

Lammers et al.

[11] Patent Number: 4,772,151
[45] Date of Patent: Sep. 20, 1988

[54] PIVOT ASSEMBLY

[75] Inventors: Bryan G. Lammers, Washington; Charles F. Sieck, Dunlap, both of Ill.

[73] Assignee: Caterpillar Inc., Peoria, Ill.

[21] Appl. No.: 135,790

[22] Filed: Dec. 21, 1987

[51] Int. Cl.$^4$ ............................................. F16C 11/06
[52] U.S. Cl. .................................... 403/162; 403/227; 180/9.5
[58] Field of Search .............. 403/227, 224, 225, 163, 403/162, 228; 180/9.5, 9.52, 9.54, 9.56, 9.58, 9.6

[56] References Cited

U.S. PATENT DOCUMENTS

| | | | |
|---|---|---|---|
| 2,346,574 | 4/1944 | Guy | 403/224 |
| 2,845,310 | 7/1958 | Butkus | 308/41 |
| 2,935,347 | 5/1960 | Liversage | 403/227 |
| 2,937,040 | 5/1960 | Hutton | 403/227 |
| 3,989,126 | 11/1976 | Katzer | 188/206 |
| 4,133,401 | 1/1979 | Allen et al. | 180/9.5 |
| 4,141,423 | 2/1979 | Cline et al. | 180/9.6 |
| 4,150,468 | 4/1979 | Harbottle | 29/148.4 |
| 4,175,806 | 11/1979 | Taylor | 308/238 |

*Primary Examiner*—Andrew V. Kundrat
*Attorney, Agent, or Firm*—Claude F. White

[57] ABSTRACT

A pivot assembly provides limited pivotal motion between a relatively stationary member and a relatively moveable member which is supported on the stationary member. The stationary member is secured to a vehicle frame and the moveable member forms a portion of an endless track supporting frame. The pivot assembly includes a plurality of elastomeric bearings between the stationary and moveable members and a loading member to compress and preload the bearings. Conventional pivot assemblies utilize metal sleeve, roller or ball bearings to provide relative pivotal motion between stationary and cooperative moveable members. Such metal bearings require constant lubrication, and seals to contain the lubrication, and produce objectionable noise and vibration. The subject pivot assembly requires no lubrication or seals and generates low levels of noise and vibration by isolating the stationary and moveable members with the elastomeric bearings. The dual tapered, elastomeric preloaded bearings restrain and capture the relatively moveable member axially and radially without a thrust bearing.

11 Claims, 2 Drawing Sheets

PIVOT ASSEMBLY

DESCRIPTION

TECHNICAL FIELD

This invention relates generally to a pivot assembly and more particularly, to a pivot assembly which provides relative pivotal motion between a moveable frame member and a stationary shaft member. The frame member is supported upon the shaft member by elastomeric bushings which are compressed between the frame and the shaft.

BACKGROUND ART

Earthmoving and construction vehicles utilize endless track assemblies for supporting and propelling the vehicle. These track assemblies are generally supported by a track frame which is then connected to the vehicle main frame by some type of shaft which allows the track frame to pivot relative to the main frame.

Typical track frame and pivot shaft connections are shown in U.S. Pat. Nos. 4,133,401 and 4,141,423 issued respectively on Jan. 9, 1979 and Feb. 27, 1979, and both assigned to the assignee of record. Each of these patents disclose a track frame pivotally mounted on a pivot shaft by means of sealed and lubricated bearings. Sealing and lubricating of the bearings is essential to satisfactory operation and extended life of the bearings and the assembly.

U.S. Pat. No. 1,845,310 discloses a journal box having a thrust absorbing assembly including a resilient thrust member. As the axle moves endwise toward the rotatable thrust bearing, the resilient thrust member is compressed and undergoes a shear deformation in the axial direction. In this structure, the resilient thrust member rotates with the axle of the assembly.

The first two above noted patents provide adequate pivotal motion between a track frame and a pivot shaft, but are complicated and require periodic servicing. The metallic bearings require constant lubrication, and seals are necessary to contain the lubrication.

The last above noted patent has a resilient thrust bearing and is utilized in an axial thrust application. This bearing also rotates with the rotatable portion of the axle assembly.

The present assembly is directed to overcoming one or more of the problems as set forth above.

DISCLOSURE OF THE INVENTION

In one aspect of the present invention, a pivot assembly includes a pivot shaft member and a frame member mounted upon the pivot shaft. The pivot shaft has a flanged mounting portion, a bearing receiving surface, and an end cap receiving portion. The frame member has a through bore, for receiving the pivot shaft, and a plurality of bearing receiving surfaces. The pivot assembly further includes an end cap, a plurality or elastomeric bearings between the frame and the pivot shaft, and means to secure the end cap to the pivot shaft. The end cap has a cavity, for receiving a portion of the pivot shaft, and a bearing receiving surface.

Endless track laying vehicles utilize a track frame to support the endless track assembly with the track frame generally connected to the vehicle main frame by means of some type of a pivot shaft. The track frame pivots on the shaft to provide relative pivotal motion between the frame and the shaft. Metal ball, roller, or sleeve bearings interposed between the frame and the shaft permit such pivotal motion. Such metal bearings require continuous lubrication, an oil reservoir, and oil seals to contain the oil within the bearing area. Noise and vibration can also be generated in and through the metal bearing assemblies. The subject invention provides a simplified pivot assembly which eliminates lubrication of the assembly and reduces undesirable noise and vibration by utilizing elastomeric bearings in the pivot assembly.

BEST MODE FOR CARRYING OUT THE INVENTION

Figure 1:
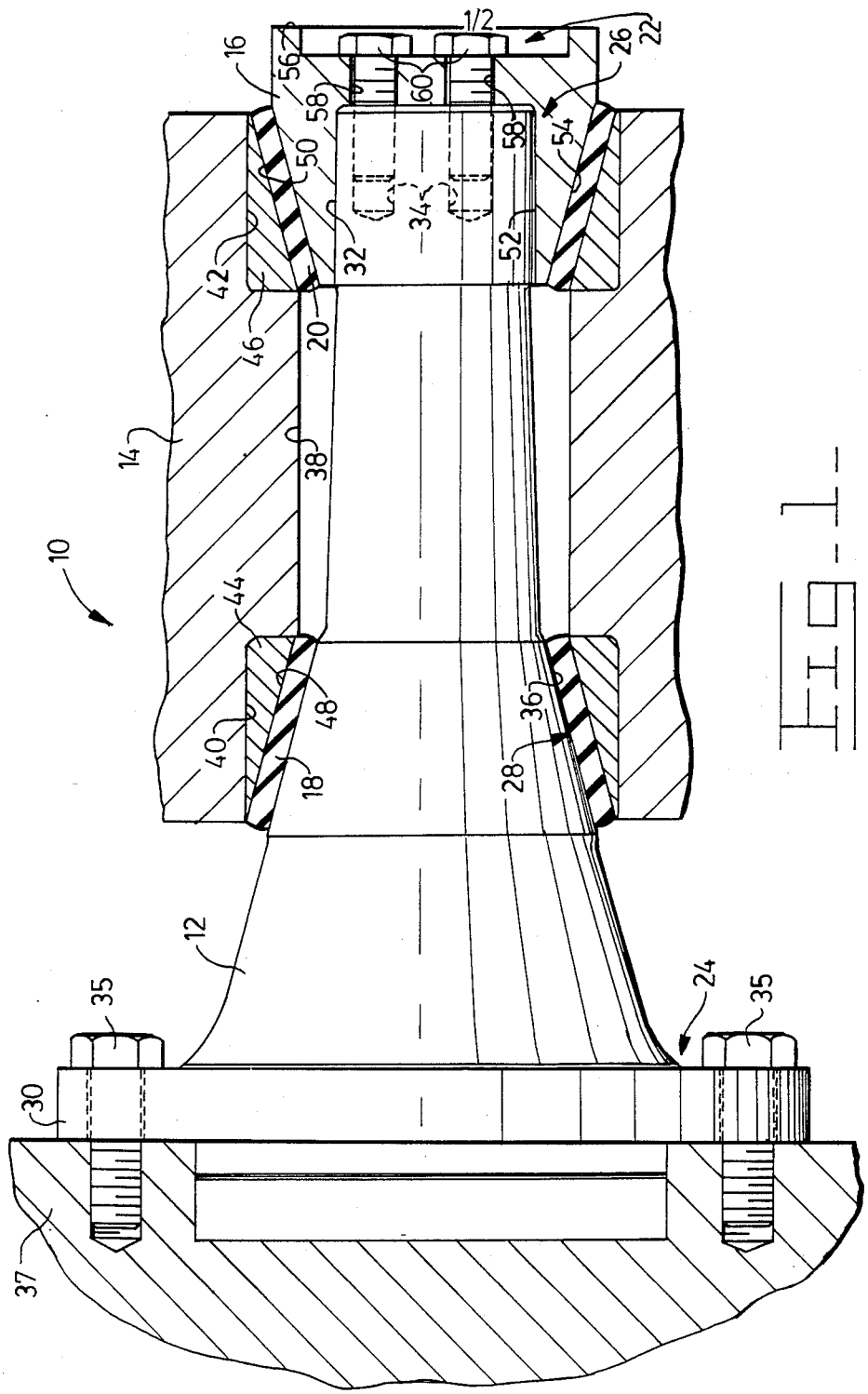
FIG. 1 is a diagrammatic side elevational view, partly in section, of an embodiment of the present invention.

With reference to the drawings, and in particular FIG. 1, a support or pivot assembly 10 includes a pivot shaft member 12, a frame member 14, an end cap or securing member 16, first and second elastomeric bearings or bushings 18,20, and means 22 for securing the end cap 16 to the shaft member 12. The shaft member 12 has first and second end portions 24,26, and an intermediate bearing receiving portion 28. The first end portion 24 includes a mounting flange 30 and the second end portion 26 includes a cylindrical surface 32 and a plurality of threaded holes 34. A plurality of threaded fasteners 35 secure the flange 30, and therefore the pivot assembly 10 to a vehicle 37 or other similar structure. The bearing receiving portion 28 preferably includes a frustoconical tapered surface 36. The cylindrical surface 32 serves to receive the end cap 16.

The frame member 14 has a through bore 38 and counterbores 40,42 one at each end of the through bore 38. Metal cylindrical inserts 44 and 46 are secured within the counterbores 40 and 42 respectively. Inserts 44 and 46 have interior frustoconical tapered bearing surfaces 48 and 50 formed respectively thereon. The bore 38 of the frame member 14 is adapted to receive the shaft member 12 in the assembled condition of the pivot assembly 10.

The end cap 16 has a cylindrical cavity or blindbore 52, an exterior frustoconical tapered bearing receiving surface 54, and an end surface 56. The cavity 52 is of a size to receive the cylindrical surface portion 32 of the shaft 12. The securing means 22 includes the threaded holes 34, a plurality of openings 58 extending from the end surface 56 into the cavity 52, and a threaded fastener 60 inserted into each opening 58. The fasteners 60 engage the holes 34 in the shaft 12 to secure the end cap 16 to the shaft 12 and at the same time substantially secure the frame member 14 to the shaft 12.

Elastomeric bearing 18 is positioned between the tapered surface 36 of the shaft 12 and the tapered surface 48 of the insert 44. Elastomeric bearing 20 is positioned between the tapered surface 54 of the end cap 16 and the tapered surface 50 of the insert 46. Bearings 18 and 20 are preferably bonded to the inserts 44 and 46 although they could be bonded to the respective shaft 12 and the end cap 16. It is also possible that the bearings 18 and 20 could be separate cones of elastomeric material not bonded to either metal part. The elastomeric bearings of this invention are preferably formed of natural or synthetic rubber, but it should be understood that other elastomeric materials can be utilized without departing from this invention.

Figure 2:
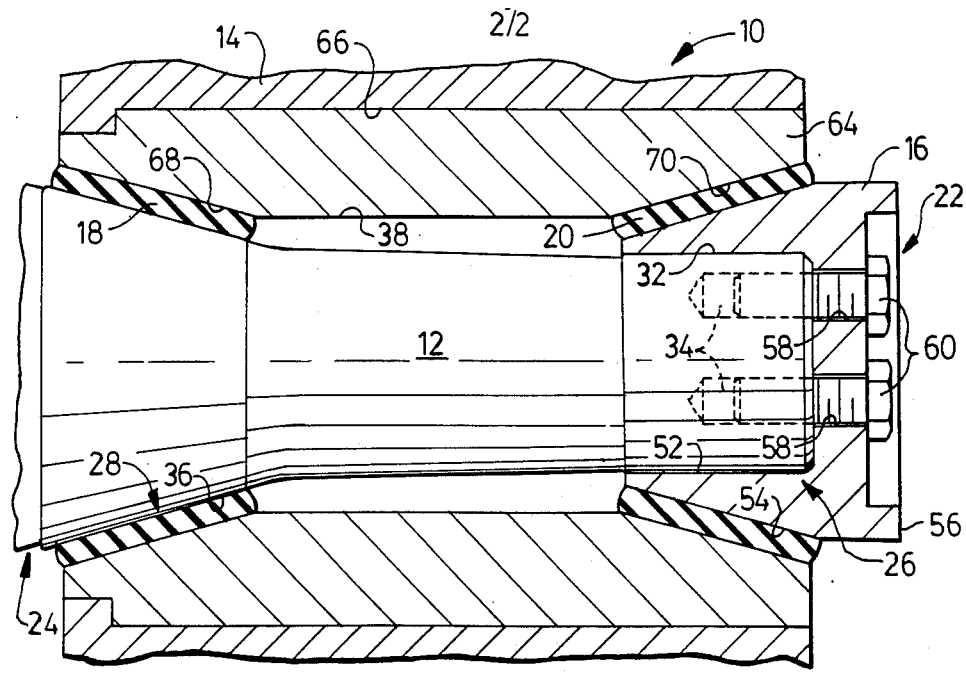
FIG. 2 is a diagrammatic side elevational view, partly in section, of a second embodiment of the present invention.
Figure 3:
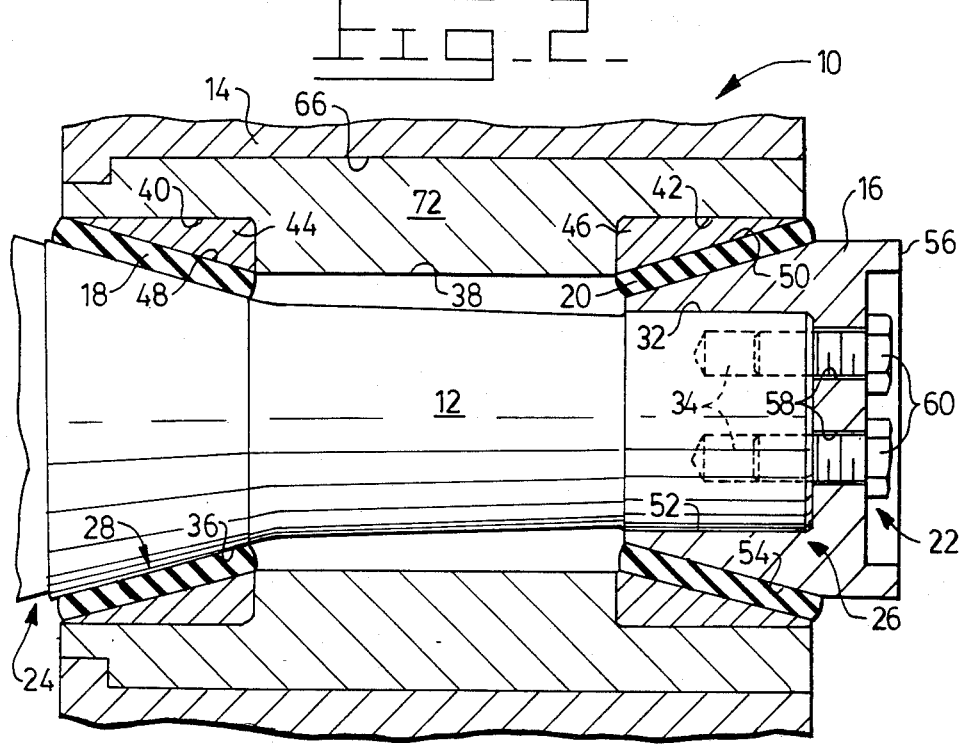
FIG. 3 is a diagrammatic side elevational view, partly in section, of a third embodiment of the present invention.

With reference to FIGS. 2 and 3, second and third embodiments of the invention are illustrated. In these embodiments, elements which are similar to the preferred embodiment of FIG. 1 are identified by the same element numbers. The structures shown in FIGS. 2 and 3 are only slightly different from that of FIG. 1, and only the differences will be described. The structure of FIG. 2 has a single hard sleeve or insert 64 which replaces the two smaller inserts 44 and 46 of the FIG. 1 embodiment. Insert 64 is secured within a bore 66 of the frame member 14 and has first and second frustoconical tapered surfaces 68 and 70 to which the elastomeric bearings 18 and 20 are respectively bonded. The FIG. 3 embodiment has a sleeve 72, which is similar to sleeve 64, secured within a bore 66 of the frame member 14. Sleeve 72 has metal inserts 44 and 46 secured within counterbores 40 and 42 respectively, similar to the FIG. 1 embodiment.

INDUSTRIAL APPLICABILITY

With reference to the drawings, the subject pivot assembly 10 is particularly useful for providing limited relative pivotal motion between two structural members, normally one fixed and one moveable. In the embodiment illustrated the shaft member 12 is secured by fasteners 35 to the vehicle structure 37. The frame member 14 is then positioned onto the shaft 12 and the elastomeric bearing 18 contacts the tapered surface 36. The end cap 16 is then positioned onto the second end position 26 of the shaft 12 and the threaded fasteners 60 are threaded into the holes 34. As the fasteners 60 are drawn up tight, the tapered surface 54 contacts the elastomeric bearing 20 and forces the frame 14 further onto the shaft 12 until the frame 14 is tightly secured onto the shaft 12 and the elastomeric bearings 18 and 20 are compressed. The frame 14 can now move or pivot relative to the shaft 12 due to flexing or shearing of the elastomeric bearings 18 and 20. Relative pivotal movement between the frame 14 and the shaft 12 is limited to approximately plus or minus 3 degrees.

Because there are no contacting moving metal parts in the pivot assembly 10, no lubrication within the assembly is required. The absence of lubrication also obviates the need of any type of seals. The elastomeric bearings 18 and 20 also serve as isolation barriers between the frame 14 and the shaft 12 to reduce transfer or amplification of noise and vibrations between these two members.

Other aspects, objects and advantages of the present invention can be obtained from a study of the drawings, the disclosure, and the appended claims.

We claim:

1. A pivot assembly comprising:
   a shaft member having a mounting portion, a bearing receiving surface, and an end cap receiving portion;
   a frame member having a through bore and first and second bearing receiving surfaces within said bore, said bore being adapted to receive said shaft member;
   an end cap having a cavity and a bearing receiving surface, said cavity adapted to receive said end cap receiving portion;
   a plurality of elastomeric bearings, one positioned between said bearing receiving surface of said shaft member and said first bearing receiving surface of said frame member, and one positioned between said bearing receiving surface of said end cap and said second bearing receiving surface of said frame member; and
   means for securing said end cap to said end cap receiving portion of said shaft member, and for securing said frame to said shaft member, said elastomeric bearings being compressed when said frame and shaft members are secured together.

2. The pivot assembly, as set forth in claim 1, including a metal sleeve secured within said bore and said first and second bearing receiving surfaces are formed on said sleeve.

3. The pivot assembly, as set forth in claim 1, wherein said bearing receiving surface of said shaft member is a frustoconical surface and said first bearing receiving surface of said frame member is shaped complimentary to said frustoconical surface.

4. The pivot assembly, as set forth in claim 1, wherein said bearing receiving surface of said end cap is a frustoconical surface and said second bearing surface of said frame member is shaped complimentary to said frustoconical surface.

5. The pivot assembly, as set forth in claim 1, including a counterbore at each end of said through bore and a metal insert secured within each counterbore, said first and second bearing receiving surfaces being formed on said inserts.

6. The pivot assembly, as set forth in claim 1, wherein said elastomeric bearings are bonded to the bearing receiving surfaces of one of said shaft member, said frame and said end cap.

7. The pivot assembly, as set forth in claim 1, wherein said securing means includes a plurality of threaded holes in said end cap receiving portion, a plurality of through bores in said end cap, and a plurality of threaded fasteners adapted to penetrate said through bores and said threaded holes.

8. The pivot assembly, as set forth in claim 2, including a counterbore at each end of said sleeve and a metal insert secured within each counterbore, said first and second bearing receiving surfaces being formed on said inserts.

9. The pivot assembly, as set forth in claim 8, wherein said elastomeric bearings are bonded to said bearing receiving surfaces.

10. A support assembly comprising:
    a pivot shaft having first and second end portions, and an intermediate tapered surface portion, said first end portion having a mounting flange and said second end portion having a cylindrical surface and a plurality of threaded holes;
    a moveable frame member having a through bore and first and second counterbores at opposite ends of said through bore;
    first and second cylindrical inserts, each having an interior tapered surface portion, said inserts being secured respectively within said first and second counterbores;
    a securing member having a cylindrical cavity, an exterior tapered surface portion, an end surface, and a plurality of openings extending from said end surface into said cavity;
    first and second elastomeric bushings, said first bushing adapted to be secured between said pivot shaft tapered surface portion and said first insert tapered surface portion, and said second bushing adapted to be secured between said securing member tapered surface portion and said second insert tapered surface portion; and a plurality of threaded fasteners adapted to secure said securing member and said frame member to said pivot shaft and compress said elastomeric bushings.

11. The support assembly of claim 10, wherein said first elastomeric bushing is bonded to said first insert tapered surface portion and said second elastomeric bushing is bonded to said second insert tapered surface portion.

* * * * *